Feb. 2, 1954

N. E. LEE 2,668,033

MOUNTING

Filed July 7, 1945

*INVENTOR.*
NORMAN E. LEE
BY
William D. Hall
ATTORNEY

Patented Feb. 2, 1954

2,668,033

UNITED STATES PATENT OFFICE 2,668,033

MOUNTING

Norman E. Lee, Forest Hills, N. Y.

Application July 7, 1945, Serial No. 603,733

1 Claim. (Cl. 248—358)

(Granted under Title 35, U. S. Code (1952), sec. 266)

The invention described herein may be manufactured and used by or for the Government for governmental purposes, without the payment to me of any royalty thereon.

The present invention relates to improvements in mountings (Case 7) and more particularly to improvements in mounting means of the type used to sustain a load relative to a base, so as to prevent, or at least minimize, the transmission of vibrations, shocks and noises from said load to said base, and vice versa.

Some installations require mounts which will protect against a number of different kinds of impulses. For instance, in aircraft sensitive apparatus must be shielded from forced vibrations of the engines and associated parts, at various speeds, including that speed at which there are generated vibrations of the resonant frequency of the mounted equipment, and also from shocks occurring in rough air and when landing.

In marine installations, provision must be made not only against vibrations set up by the engines, shafts and propellers, which operate at variable speeds, usually of lower frequencies than in aircraft, but also against deflections caused by pitching and rolling of the vessel.

In vehicular installations the problem is more complicated as the supports must provide protection against forced vibrations of the engines and associated parts, operating at variable speeds, including the natural vibrating frequencies; vibrations due to substantially uniform, minor irregularities of the road beds traversed by the vehicles, which usually have abrupt wave-forms, and shocks due to holes and abnormal irregularities in the road surfaces. These conditions are greatly exaggerated in the case of military vehicles which often must cover terrain far rougher than that covered by other vehicles and which may also be subjected to ballistic impacts and concussions.

Vibration and shock mounts of the prior art, although used in tremendous quantities, have been found to be badly defective in performing their intended purposes.

Some mounts are capable of curtailing the transfer of vibrations of relatively high frequency, but are unsatisfactory because they allow vibrations at the resonant or natural frequency of the supported load to be so greatly amplified as to be seriously detrimental.

Some operate to attenuate deflections in only one direction of movement, such as vertical, and are therefore unsuited to installations requiring attenuation in several directions.

Some are equipped with snubbers which come into play abruptly when the deflections reach a certain amplitude and, as a result, they set up violent counterforces and regularly recurrent shocks which are often more destructive to sensitive apparatus than the vibrations and shocks which the mounts are intended to absorb.

Again, some mounts are so designed that, if the spring material (such as rubber) is injured, as by tearing, or there is a separation of a bond between the spring material and the metal, the mounted equipment may separate entirely from the base and be severely damaged.

Some supports, having hydraulic systems comprising a cylinder and a piston operating therein, have excellent vibration damping characteristics but are relatively large in size and are expensive to manufacture and maintain, and they also are subject to leakage of the hydraulic medium therefrom. In addition, they are generally good in only one direction and they require a spring system separate from the hydraulic system.

In some mounts, oscillations persist and add to later oscillations so as to amplify rather than reduce them.

It is intended by the present invention to provide shock and vibration supports which are not attended by defects of earlier mounts.

It is an object of the present invention to provide means of supporting equipment which will satisfactorily isolate and absorb vibrations and shocks of various frequencies.

It is also an object to provide a mount which may be stiff enough so as not to unduly amplify low frequency and resonant frequency oscillations, but still soft enough to attenuate high frequency oscillations and thrusts of great force, without giving rise to countershocks.

It is another object to provide a mount which incorporates both a shock absorbing system and a spring system in a single unit.

It is still another object to provide supports wherein the action of the spring system facilitates the operation of the absorbing system.

It is a still further object to provide such mounts wherein natural rubber or a similar material may be used as the spring system and wherein deformations of said material are utilized to accelerate the functioning of the shock absorption system.

It is a further object to provide supporting means which will cushion displacements in different directions, such as vertical, horizontal and rotational.

Another object is to employ hydraulic damping in mounting devices which are so designed that they will not suffer from leakage of the hydraulic medium, which will be small in size relative to earlier hydraulic mounts, which will not incorporate solid, nonresilient parts moving against each other with resultant wear, and changes in operating characteristics and replacement of parts.

It is still another object to proivde mounts in which the hydraulic medium is confined in extensible chambers which provided the necessary volumetric capacity for the medium under different conditions of operation.

Still another object is to provide mounts having external dimensions which allow them to be substituted for presently manufactured mounts without necessitating structural changes in either the base or the load.

A still further object is to provide mounts designed to absorb and attenuate shocks in most directions to such a degree as to eliminate the need of snubbers and thereby avoid the violent countershocks frequently caused thereby.

It is still another object to provide mounts wherein metal to metal contacts are eliminated and hence the transfer of sound, as well as vibration and shock, is inhibited.

It is also an object to provide a mount which, despite unusual vibrations and shocks, and wear and tear, will not allow the equipment sustained thereby to tear loose entirely from the base.

Generally, a mounting embodying the present invetnion includes a spring element, of a resilient, flexible material (such as natural or synthetic rubber). Said spring element includes an active or effective portion (which in some embodiments may be the entire spring element) which I have chosen to call the "buckling column" portion. When such a "buckling column" portion is subjected to loading (as in the form of a shock) in an axial direction, it is initially relatively stiff and gets softer (per unit of deflection) and finally gets stiff again at extreme amplitudes. Such a "buckling column" portion is preferably tubular in shape, and is first put into compression and acts as a "column," and then, at a predetermined critical point, collapses and goes into flexure. Such a "buckling column" portion is relatively stiff under normal loads and will thus prevent undue amplification of the lower frequency vibrations (which are involved particularly in vehicular suspensions), but under sharp surges suddenly gets softer (per unit of deflection), so as to prevent the transmission of large force impulses to the equipment, and then gets progressively stiffer, so as to stop deflections within the amplitude limitations of the mounting without the need of abruptly acting snubbers. In the interior of mounts embodying the present invention are two hydraulic chambers connected by restricted orifices which chambers contain a suitable hydraulic medium. In the use of the mount, the hydraulic medium is forced back and forth through said orifices by deformations of spring elements such as described above.

In order to better understand the structure and function of a "buckling column" portion of a spring element, it should be noted that some portions of a spring element may be included only for the purpose of mechanical coupling and arrangement of the several components of a shock mount, but in every spring element of the buckling type, there is a certain portion which, when subjected to axial thrust, acts as pointed out above, that is, it operates in compression as a "column" under thrusts of lesser degree but it is, nevertheless, free to buckle or collapse into flexure under thrusts of a greater degree.

A spring element is preferably secured or coupled to the other components of a shock mount so that its operation is controlled so that it follows a desired mode of operation. The securing or coupling means may take various forms. For instance, one or both ends of a spring element may be bonded to a metal member (as by a rubber-to-metal bond or by a suitable adhesive) as are both ends of the spring elements, shown in the drawing, or it may be secured by suitable clamps (not shown).

Sometimes, however, the ends of a spring element are not actually mechanically secured but they are suitably shaped so that a desired mode of buckling operation occurs. This may be accomplished by having an end of a spring element terminate in a substantially flat and relatively wide surface so that, in operation, it abuts against some other flat surface and does not rotate. Such a surface keeps a spring element in intimate abutment with a flat plate during the buckling phase of the operation of the element.

It is highly significant that this accomplishes a "triple mode" flexure of the spring element (see 31U in Fig. 4), that is, flexure occurs at three different places, viz., at the central portion and also at both ends. This causes a tremendous deformation of the material of the rubber of the spring element which is important for at least three reasons; (1) considerable shock energy is dissipated in the work of deforming the rubber, (2) this occurs over a longer period of time than the time of the shock itself, thereby resulting in isolating a load completely from the shock or at least subjecting a load to a considerably lower and less damaging acceleration than the acceleration of the shock itself, and (3) considerable restoring force is stored up in the triply flexed rubber, which force is needed to bring the spring element back to its unloaded state.

Where no portions of a spring element are used for mechanical coupling of the spring element to other components of a shock mount, then usually all or substantially all of the axial length of the spring element is free to operate in compression-flexure, as already described, and hence its "buckling column" portion extends through the entire spring element. However, where the ends of the spring element are secured by metal clamps or are otherwise constrained as by being widened out considerably so that they are not free to undergo compression at one stage of operation, and to undergo buckling at another stage of operation, such end portions are not considered to be included in the "buckling column" portion. An example of the latter may be seen, for instance, in my co-pending application Serial Number 603,735, now matured as U. S. Patent No. 2,582,998, issued January 22, 1952, where the ends of the spring elements are widened out laterally and are also stiffened by the embedded washers. There the "buckling column" portion is essentially the vertically disposed web intermediate the widened out ends.

It is to be noted that the ratio of the length of the "buckling column" portion, in an axial direction, to its width must be such that, under axial thrusts of less force than a predetermined critical amount, said "buckling column" portion is stable and acts as a "column" undergoing compression. However, when the force of a thrust reaches this critical amount, the "buckling column" portion suddenly becomes unstable and buckles or collapses and goes into flexure. It should be pointed out that when a member of rubber-like material is deformed the deformation does not usually consist purely of compression or flexure or shear. Rather, it is a combination of two or more of these. Hence, when it is stated in the present application that the "buckling column" portion operates in "compression" or in "flexure," applicant intends to convey the thought that that is the primary or main mode of operation. Experience has indicated that in order to achieve the unique buckling type of operation referred to herein the length to width ratio of the "buckling column" portion of a spring element must be at least two to one. If it is less, the spring element will probably remain stable and will operate mainly in compression irrespective of the amount of thrust applied. If the ratio is at least two to one, and the "buckling column" portion is otherwise suitably designed, it will act in compression until the critical amount of loading is applied, whereupon it will suddenly collapse and its operation will then be mainly flexure. This will permit considerably more deflection per unit of load than when it was operating mainly in compression.

A preferred embodiment, as illustrated in the drawings (Figures 1–6) and as hereinafter described in more detail, comprises a load spool including two parallel load plates joined by a core; a base plate having a central opening terminating in a tire-like spring collar encircling said core; two generally tubular spring elements, having the operating characteristics described above, interposed respectively between the base plate and each of the load plates, whereby there is formed respectively above and below the base plate two hydraulic chambers containing a suitable hydraulic medium. Said chambers interconnect by way of restricted orifices, such as orifices through the base plate and/or the spring collar; and in a particular embodiment of the invention, the orifices may reside merely in a labyrinth of pores in a throttling spring collar which is then made up of a permeable material.

Another preferred embodiment (Figure 7) comprises a load plate and a base plate spanned by a pair of concentric spring elements, having the operating characteristics described above, so arranged that when they collapse the inner one will collapse inwardly and the outer one outwardly, whereby two hydraulic chambers are formed; restricted orifice interconnecting said hydraulic chambers and a suitable hydraulic medium within the said chambers.

In the accompanying drawings (wherein for clarity the hydraulic medium is not shown) Figure 1 is a plan view of a preferred form of mounting embodying the present invention, shown in its normal, at rest condition, a portion of the upper load plate broken away to show the interior of the mount;

Figure 1:
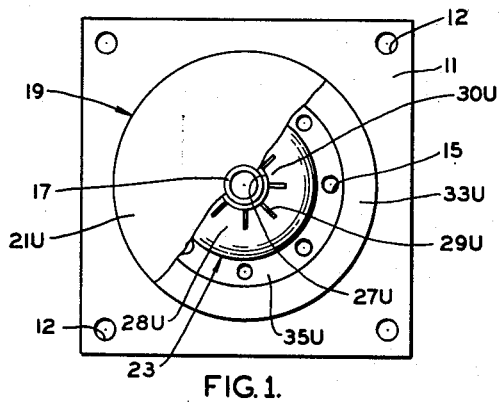
Figure 5:
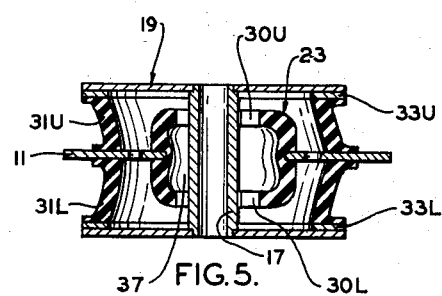
Figure 2:
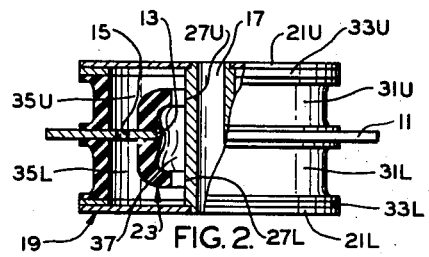
Figure 2 is an elevational view, partly sectioned along the line 2—2, of the mounting of Figure 1.
Figure 6:
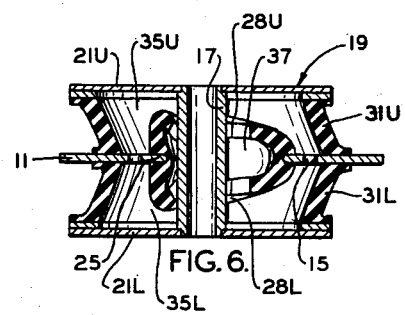
Figure 3:
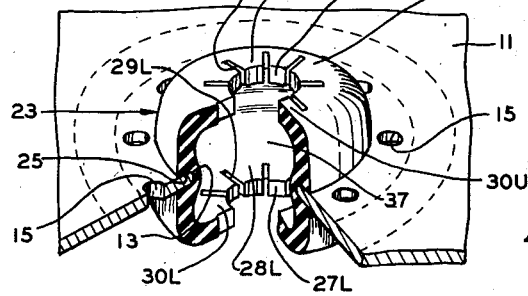
Figure 3 is an enlarged, fragmentary, perspective view of the base plate and spring collar of the mount of Figures 1 and 2, the portion of the surface to which the upper spring element is bonded being indicated by broken lines.
Figure 7:
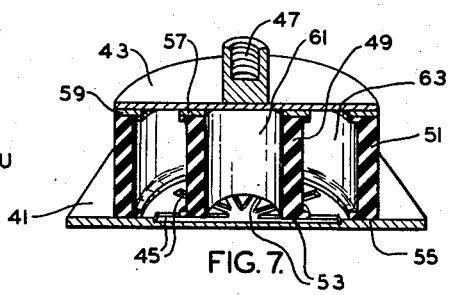
Figure 4:
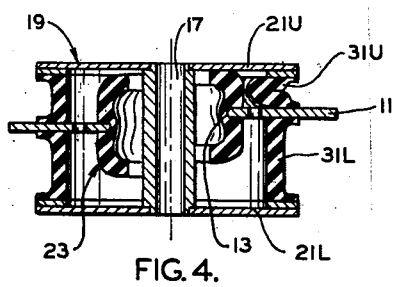

Figure 4 is a vertical composite section taken along the line 2—2 of Figure 1, wherein, to the left, the parts are shown in their condition when the base plate is in a slightly upwardly deflected position and the upper spring element is being subjected to compression as a column, and, to the right, the parts are shown in their condition when the base plate is deflected upwardly, almost to its position of maximum amplitude, and the upper spring element is in its collapsed position, wherein it is undergoing flexure;

Figure 5 is a vertical section, similar to Figure 4, except that the parts are shown in their condition when the base plate is laterally deflected slightly to the right and the spring fingers of the spring collar, to the left of the core, act as columns under compression;

Figure 6 is a view similar to Figure 5, wherein the base plate is being subjected to a more extreme lateral deflection to the right and the spring fingers are in collapse and are being subjected to flexure; and Figure 7 is a vertical cross section of a modified form of the present invention, wherein a single load plate is used and the two hydraulic chambers are disposed one within the other.

Referring now particularly to Figures 1–6, the form of mounting there shown includes a horizontally disposed base plate 11, which is square in outside configuration and is pierced by four corner holes 12 receivable to bolts or other fastening means (not shown). Said base plate 11 is provided with a central circular opening 13 and is pierced by several small fixed orifices 15 arranged in a circle concentric with said central opening 13.

Extending concentrically through the opening 13 is a vertically disposed, tubular, metal core 17 of a load spool 19. Secured to the ends of said core 17 are horizontally disposed, upper and lower load plates 21U, 21L. Said load plates 21U, 21L may be joined to said core 17 by welding or any other suitable means.

Encircling the core 17, and coaxial therewith, is a spring collar 23 (see particularly Figure 3), which is made of a flexible resilient material such as natural or synthetic rubber, and which is shaped substantially like a vehicular tire. Said spring collar 23 is provided with a horizontal slot 25 about its outer periphery, in which slot is positioned the inner marginal edge portion of the base plate 11. Said base plate is preferably permanently bonded in said slot 25. The upper and lower rims 27U, 27L of the spring collar encircle the core 17 and make a snug sliding fit thereabout.

The upper and lower walls 28U, 28L of said spring collar 23 are provided with several narrow, radially disposed slots 29U, 29L, which form variable orifices as will be hereinafter explained, so as to form a plurality of radially positioned upper and lower spring fingers 30U, 30L. Said spring fingers 30U, 30L are positioned substantially horizontally and have relatively flat upper and lower surfaces.

Positioned above the base plate 11 is an upper spring element 31U of a resilient flexible material, such as natural or synthetic rubber. Said spring element 31U is of such geometric configuration that, upon being pressed together longitudinally between the base plate 11 and the upper load plate 21U, it will first act as a relatively stiff column under compression and then, with increased pressure, will suddenly collapse so as to flex inwardly and will be much softer.

As shown in the drawings, the said spring member 31U may be bounded inwardly and outwardly by substantially cylindrical surfaces, except that the outer cylindrical surface is concave throughout its central portion. The lower end of said upper spring element 31U is secured, as by a metal to rubber bond, to the upper surface of the base plate 11, outside the circle of orifices 15, in the position indicated by broken lines in Figure 3. Its upper end is secured to the lower surface of an upper circular metal washer 33U, the upper surface of which washer 33U is joined to the lower surface of the upper load plate 21U, as by seam-welding or in any other suitable manner to make a seal against leakage of the hydraulic medium hereinafter referred to.

A similar lower spring member 31L is likewise secured to the base plate 11 and a similar lower metal washer 33L, which washer 33L is similarly joined to the lower load plate 21L.

It will thus be seen that the structure described incorporates three intercommunicating chambers, the upper and lower hydraulic chambers 35U, 35L and the intermediate hydraulic chamber 37, each of which chambers 35U, 35L, 37 is generally annular in shape. The upper and lower chambers 35U, 35L communicate with each other through the fixed orifices 15 and also, by way of the intermediate chamber 37, through the upper and lower variable, slot-type orifices 29U, 29L. Said chambers 35U, 35L, 37 are filled with a suitable hydraulic medium (which, for clarity, is not indicated in the drawings). Said hydraulic medium may be a liquid, such as a viscous oil or the like, or a gas, such as air, or a combination of liquid and gas.

In describing the operation of the mounting aforesaid (Figures 1–6), it will be assumed that it is being used to mount a radio set (not shown) in a motor vehicle (not shown). The base plate 11 would then be secured to the chassis of the vehicle, by means of bolts (not shown) through the holes 12, and the radio set would be secured to the load spool 19, by means of a bolt (not shown) through the hole in the core 17.

As the motor vehicle is operated, the base plate 11 is subjected to vertical oscillations, resulting in vertical movements of the base plate 11. As the base plate 11 is translated slightly vertically under thrusts of relatively small force, the spring elements 31U, 31L are subjected alternately to compression and tension, one of said elements undergoing compression while the other is undergoing tension (as shown in the left half of Figure 4). However, when the base plate 11 is translated vertically a greater distance due to increased thrusts, the spring elements 31U, 31L collapse alternately into inward flexure (as illustrated in the right half of Figure 4).

During vertical translatory movements of the base plate 11, as already described, the hydraulic medium is caused to flow back and forth between chambers 35U, 35L through the fixed orifices 15 and variable orifices 29U, 29L.

As shown in the right half of Figure 4, when the base plate 11 is deflected upwardly approaching its extreme upward position, the upper wall 28U of the spring collar 23 is squeezed upwardly against the upper load plate 21U so as to stop any flow of hydraulic medium through the variable orifices 29U. Hence, any flow of said medium between the chambers 35U, 35L must then be through the fixed orifices 15. Also, during such relatively large vertical deflections, the upper or lower halves of the spring collar 23 are subjected alternately to some deformation due to being squeezed between the base plate 11 and one of the load plates 21U or 21L.

Horizontal translations of the base plate 11 (Figures 5 and 6), will cause the upper and lower spring elements 31U, 31L to be subjected to a shearing action. If such lateral deflections of the base plate 11 are of relatively small amplitude (Figure 5), the spring fingers 30U, 30L, to one side of the core 17, will act as columns under compressive strain. However, when such lateral deflections are of greater amplitude (Figure 6), the said spring fingers 30U, 30L will collapse upwardly and downwardly, respectively, so as to go into flexure.

It will be noted that, during such lateral deflections, the shapes of the hydraulic chambers 35U, 35L are being changed constantly, thus requiring that the hydraulic medium contained therein be pushed around within said chambers (even though there may be no flow to and fro between the chambers), thereby resulting in an absorption of considerable energy.

Should there be any twisting or rocking movements imparted to the base plate 11, the mount described has sufficient rotational compliance to attenuate them.

During such rotational movements there will also be an energy absorption due to the hydraulic system as there may be some flow of the hydraulic medium between the chambers 35U, 35L and, in any event, the medium will be pushed around within each of said chambers in view of the fact that they will be changing shape constantly.

Any other movements imparted to the base plate 13 will merely be a combination of the movements already described.

It will be understood that, although the amplitude of the mount just described is limited toward the ends of vertical strokes, the mount gets progressively stiffer as it approaches a maximum deflection. The steady energy absorption by the hydraulic system, combined with the increasing recovery force stored up in the spring system, as the amplitude of deflection increases, results in a time lag in the deflection, thereby keeping the amplitude of deflection within the predetermined limits of a particular mount. Thus, by a steadily increasing storage and absorption of energy, the vibrations and shocks are attenuated without the use of bumpers, which may act with an injurious abruptness.

An important feature of the present invention is that axial deflections, which are large enough to cause collapse of one of the spring elements 31U, 31L, are, nevertheless, relatively small as compared to the changes in the relative volumetric capacities of the upper and lower chambers 35U, 35L. This is accomplished by the fact that deformations of the resilient material of the spring elements 31U, 31L and the spring collar 23 accelerate a decrease of the volumetric capacity of one of the chambers 35U, 35L while accelerating an increase of the volumetric capacity of the other. This acceleration of change in relative volumetric capacities is particularly advantageous where a hydraulic medium of low viscosity is used, as it results in a more rapid flow of the medium through the restricted orifices and, hence, a greater absorption of energy. Low viscosity liquids may sometimes be preferred because they may perform more satisfactorily over greater temperature ranges.

It is to be noted also that vertical deflections of considerable amplitude tend to reduce the total volumetric capacity of the three hydraulic chambers 35U, 35L, 37. If an incompressible hydraulic medium is being used, the said total volumetric capacity is maintained by suitable deformation and stretching of the tubular spring members 31U, 31L. The additional energy required to accomplish such deformation and stretching will be an additional drain on the force causing such extreme deflection and will, therefore, further assist in increasing the damping effect of the mount at extreme deflections.

A preferred hydraulic medium for the embodiment described above (Figures 1–6) is a suitable fluid such as oil. However, it may sometimes be advisable to use a hydraulic fluid combined with a small amount of air or other gas. In some installations, this would be helpful during extreme deflections when the combined volumetric capacity of the chambers 35U, 35L, 37 might tend to decrease. A compressible gas will then relieve excessive pressures and undue deformation of the spring elements 31U, 31L. A compressible gas would also help to compensate for pressure changes due to temperature variations.

The sizes and numbers of the fixed orifices 15 and the variable orifices 29U, 29L will, of course, be determined by various factors, including the viscosity and type of hydraulic medium being used, the load ratings of the mounts, etc.

As already indicated, the load-deflection characteristics of the embodiment described herein may be modified so as to follow optimum values by changing the hydraulic action during deflection, by varying the orifices through which the hydraulic medium must flow between the two chambers 35U, 35L. Two possible means for doing this are shown herein, but it will be understood that other means of varying the orifices may be used.

The tubular spring elements 31U, 31L may be secured directly to the load plates 21U, 21L if a suitable manufacturing technique for accomplishing this is worked out. However, in the embodiment described above, manufacturing procedures dictated that said spring elements 31U, 31L be secured to the washers 33U, 33L which, in turn, are secured respectively to the load plates 21U, 21L.

Although a particular mount will obviously be designed with certain loads and vibrations and shocks in mind, it is conceivable that, in use, a mount may be subjected to unanticipated conditions or it may be used beyond the intended useful life span of its resilient material. Should this occur the resilient material may rupture or the bonds between one of the spring elements 31U, 31L and the washers 33U, 33L or the base plate 11 may let go. Nevertheless, the load will not separate from the base and fly into space as the base plate 11 is imprisoned upon the load spool 19.

One possible modification (not shown in the drawings) of the present invention is the same as the embodiment already described (Figures 1–6), except that the fixed orifices 15 and the variable orifices 29U, 29L are not present at all and a throttling spring collar is substituted for the spring collar 23. Said throttling spring collar may have substantially the same configuration as said spring collar 23, and differs therefrom only in that it is made up of a permeable resilient material, which is pierced by a labyrinth of extremely fine circuitous pores, such as felt or possibly a very fine sponge rubber. The said pores take the place of the variable orifices 29U, 29L of the first embodiment. In this modified embodiment, the chambers 35U, 35L intercommunicate only through the tiny pores in the said throttling spring collar.

Such a modified mount, having the permeable throttling collar as just described, is designed particularly for use with a low viscosity liquid or a gaseous hydraulic medium. Forcing such a medium through the permeable material of the throttling collar causes a turbulence so that considerable energy is thereby dissipated. In this modified embodiment, the operation is similar to the first embodiment (Figures 1–6), except that the hydraulic medium must pass through the pores of the throttling collar in passing between the chambers 35U, 35L. When extreme vertical deflections of the base plate 11 occur, the passage of the hydraulic medium through the said throttling collar is not stopped entirely, but it is considerably curtailed as the throttling collar is then squeezed against one of the load plates 21U, 21L. Thus, it is seen that, toward the end of a vertical stroke, there is an increase in the damping effect analogous to the increase already described in connection with the first embodiment.

Referring now more particularly to Figure 7, the modified form of mounting there illustrated includes a flat metal base plate 41 and a flat metal load plate 43, both of which are horizontally disposed, the load plate 43 being spaced from and above the base plate 41. The base plate 41 may have any convenient peripheral configuration and is here shown as square. It is pierced at its corners by several fastening holes (not shown). The upper surface of the central portion of the base plate 41 is provided with one or more, radially disposed, short, shallow channels 45.

The load plate 43 is of circular configuration. Extending axially upwardly from the midpoint of said load plate 43, and rigidly secured thereto, as by welding or otherwise, is an internally threaded bushing 47, which is receivable to a fastening bolt (not shown).

A pair of concentric spring elements 49, 51, are interposed between the plates 41, 43. In geometric configuration said spring elements 49, 51 are similar to the spring elements 31U, 31L described above (Figures 1–6), so that, under longitudinal thrusts of sufficient force, the inner spring element 49 collapses inwardly, and the outer spring element 51 collapses outwardly. The lower ends 53, 55 of said tubular members 49, 51 are secured by any suitable means such as by a metal-to-rubber bond, directly to the base plate 41. The lower end 53 of the inner spring element 49 spans the radial channels 45 and the lower end 55 is joined to the base plate 41 beyond the outer ends of said channels 45. A pair of concentrically disposed, flat, metal washers 57, 59 are secured respectively to the upper ends of the tubular elements 49, 51 as by a suitable metal-to-rubber bond. Said washers 57, 59 are in turn securely fastened to the undersurface of the load plate 43, as by seam-welding or other suitable means.

As will be seen, the arrangement of parts just described provides a central hydraulic chamber 61 (which is positioned within the inner tubular spring element 49) and a ring-shaped chamber 63 (which encircles said inner spring element 49 and is positioned within the outer spring element 51). Said chambers 61, 63 may be filled with any suitable compressible fluid medium (not shown) which may be a gas, such as air, or a combination of a gas and a liquid, such as air and glycerine; the particular medium and viscosity thereof being determined by the intended use of the mounting. Said chambers 61, 63 intercommunicate through the channels 45.

In the operation of the mount just described, the base plate 41 may be secured, by suitable fastening means (not shown) such as bolts, to a base (not shown), and a load (not shown), which is to be vibrationally insulated from said base, may be secured to the load plate 43 by means of a bolt (not shown) screwed into the bushing 47. Assuming the installation to be of a radio set in a motor vehicle, the vehicle is the base and the radio set is the load. At rest, the mounting is then in the condition shown in Figure 7.

During operation of the motor vehicle, the base plate 41 is caused to oscillate. Slight upward deflections cause the spring elements 49, 51 to act as columns under compression and greater upward deflections cause them to collapse into flexture, as already described in connection with the first described embodiment (Figures 1–6). During slight upward deflections of the base plate 41, the hydraulic medium is compressed slightly. During greater upward deflections, however, due to the inward and outward flexures of the spring elements 49, 51, respectively, the change in the relative volumetric capacities of the hydraulic chambers 61, 63 is so great that a flow of the hydraulic medium through the channels 45 takes place. As the base plate 41 returns to its normal at rest position, the said medium flows in the opposite direction. Any downward deflections of the base plate 41 from its normal, at rest position causes tension of the spring elements 49, 51 and expansion of the hydraulic medium.

As in the other embodiments of the present invention, axial deflections of relatively small amplitude (which are still sufficient however to cause collapse of the spring elements 49, 51) will cause a relatively large change in the relative volumetric capacities of the two hydraulic chambers 61, 63, due to the fact that deformations of the resilient material of the spring elements 49, 51 accelerate an increase of the volumetric capacity of one of said chambers 61, 63 while accelerating a decrease of the capacity of the other.

The load-deflection characteristics of the said embodiment (Figure 7) may also be made to follow optimum values by changing the hydraulic action during deflection by varying the sizes of the orifices through which the hydraulic medium must flow between the two chambers 61, 63. This may be done by designing the mount so that during greater deflections, the lower end 53 of the inner spring element 49, spanning the channels 45, will sag somewhat into said channels so as to restrict the orifices therethrough and thereby slow down the flow of the medium.

The mounting shown in Figure 7 also operates to absorb vibrations and shocks in a horizontal direction. Horizontal deflections of the base plate 41 result in putting both the spring elements 49, 51 into shear. Here, as in vertical movements, the deflections are curtailed without the use of abruptly acting snubbers, by means of spring and hydraulic actions, much as described above in connection with the first embodiment.

To appreciate the superiority of mounts embodying the present invention, some study of load-deflection curves is profitable. Many commercial mounts today have a substantially linear load-deflection curve; that is, deflection and load increase at about a constant ratio except that, toward the end of the curve, the load increases more rapidly than the deflection. Thus, a load-deflection curve for such a mount is a fairly straight slanting line which swings upward steeply toward the end.

Mounts embodying the present invention, on the other hand, as already explained, are relatively stiff at first, then get softer, and finally get stiff again. Thus, a load-deflection curve for such mounts is initially quite steep and then proceeds at a lesser slope and finally swings upward again to the end of the curve.

It should be understood that a shock mount which has the best load-deflection curve is one which, for a given displacement and energy absorption, will transmit the smallest forces.

One of the members to which a shock mount is fastened, such as the chassis of a motor vehicle in the examples mentioned above, has a certain kinetic energy due to its movement. This energy must be accepted ideally by the shock mount. The energy is translated in the shock mount to the potential energy involved in straining the resilient material. The potential or strain energy is the work done in deforming the mount and it is equal to the area under the portion of the load-deflection curve traversed. The greater the thrust to which a mount is subjected and, hence, the greater the attendant kinetic energy, the larger the area under the curve.

Thus, it is seen that a mount is most satisfactory when its deflection curve is such that, for a given deflection, the area under the curve is at a maximum. It is obvious that a load-deflection curve, which is initially steep and then proceeds at a lesser slope (as in the present mount), will provide more area under it and, hence, more energy absorption than a deflection curve which is relatively linear (as is typical of present commercial shock mount practice, as mentioned above).

For thrusts having relatively large energy, it will be understood that, to absorb said energy, a relatively large area under the load-deflection curve is necessary. As the load-deflection curve of the present mount provides such area throughout the beginning of the curve, the deflection of the mount need not be as great as for commercial mounts having a relatively linear curve and, hence, the force transmitted by the present mount is less than that transmitted by such commercial mounts.

Although the embodiments shown in the drawings have particular geometries, it will be understood that various changes in geometry may be made within the spirit of the invention. Such changes in geometry and relative sizes of elements, and other modifications, may be made to suit the present mounting to different compounds of natural or synthetic rubber, to different hydraulic mediums and to different loading values.

Although not shown in the illustrated embodiments, it would be advisable to incorporate means for injecting the hydraulic medium into the chambers 35U, 35L, 37 (of Figure 1–6) and the chambers 61, 63 (of Figure 7) after the mountings are assembled.

It will be understood that each of the mounts described will also operate with its base plate secured to a load and its load spool or load plate secured to a base.

While there have been described what at present are considered three preferred embodiments of the present invention, it will be obvious to those skilled in the art that various changes and modifications may be made therein without departing from the invention and it is, therefore, aimed in the appended claim to cover such changes and modifications as fall within the true spirit and scope of the invention.

What is claimed is:

A mounting to sustain a load relative to a base, comprising a load spool, including two mutually parallel spaced end plates, and a core rigidly joining said end plates and normal thereto; a substantially tire-shaped spring collar encircling said core, intermediate said load plates, and longitudinally slidable upon said core; substantially radially disposed spring fingers defining slots through the wall of said spring collar, said spring fingers undergoing compression under slight thrusts in a radial direction and collapsing into flexure under greater thrusts in a radial direction; a base plate pierced by a central opening secured to the outer periphery of the spring collar, said base plate being disposed intermediate the load plates and substantially parallel thereto; two tubular spring elements disposed coaxially with the core and spaced therefrom, said spring elements being interposed between the load plates and on opposite sides of the base plate, each being secured at one end to one of the load plates and at the other end to the base plate; the base plate being pierced by fixed restricted orifices positioned between the spring collar and the spring elements; each spring element compressing as a column under slight axial thrusts and collapsing into inward flexure under greater axial thrusts; two hydraulic chambers of substantially annular configuration disposed respectively on opposite sides of the base plate and at least partially bounded by the two tubular spring elements; said hydraulic chambers intercommunicating through the fixed orifices in the base plate and the slots through the spring collar; a hydraulic medium within said chambers; the spring collar, upon axial deflections of relatively large amplitude, pressing against one or the other of the load plates and thereby reducing the flow of the hydraulic medium through said slots.

NORMAN E. LEE.

References Cited in the file of this patent

UNITED STATES PATENTS

| Number | Name | Date |
|---|---|---|
| 2,080,919 | Ihln | May 18, 1937 |
| 2,351,427 | Henshaw | June 13, 1944 |
| 2,380,899 | Strachovsky | July 31, 1945 |
| 2,379,763 | Sweet | July 3, 1945 |
| 2,382,372 | Wallerstein | Aug. 14, 1945 |
| 2,535,080 | Lee | Dec. 26, 1950 |
| 2,539,443 | Lee | Jan. 30, 1951 |

FOREIGN PATENTS

| Number | Country | Date |
|---|---|---|
| 50,180 | France | Oct. 10, 1939 |

OTHER REFERENCES

Crede: Vibration and Shock Isolation, 1951. (Copy in Div. 52.)